J. BINGHAM.
PROCESS OF MAKING CUP AND CONE MEMBERS FOR ROLLER BEARINGS.
APPLICATION FILED JULY 16, 1917.

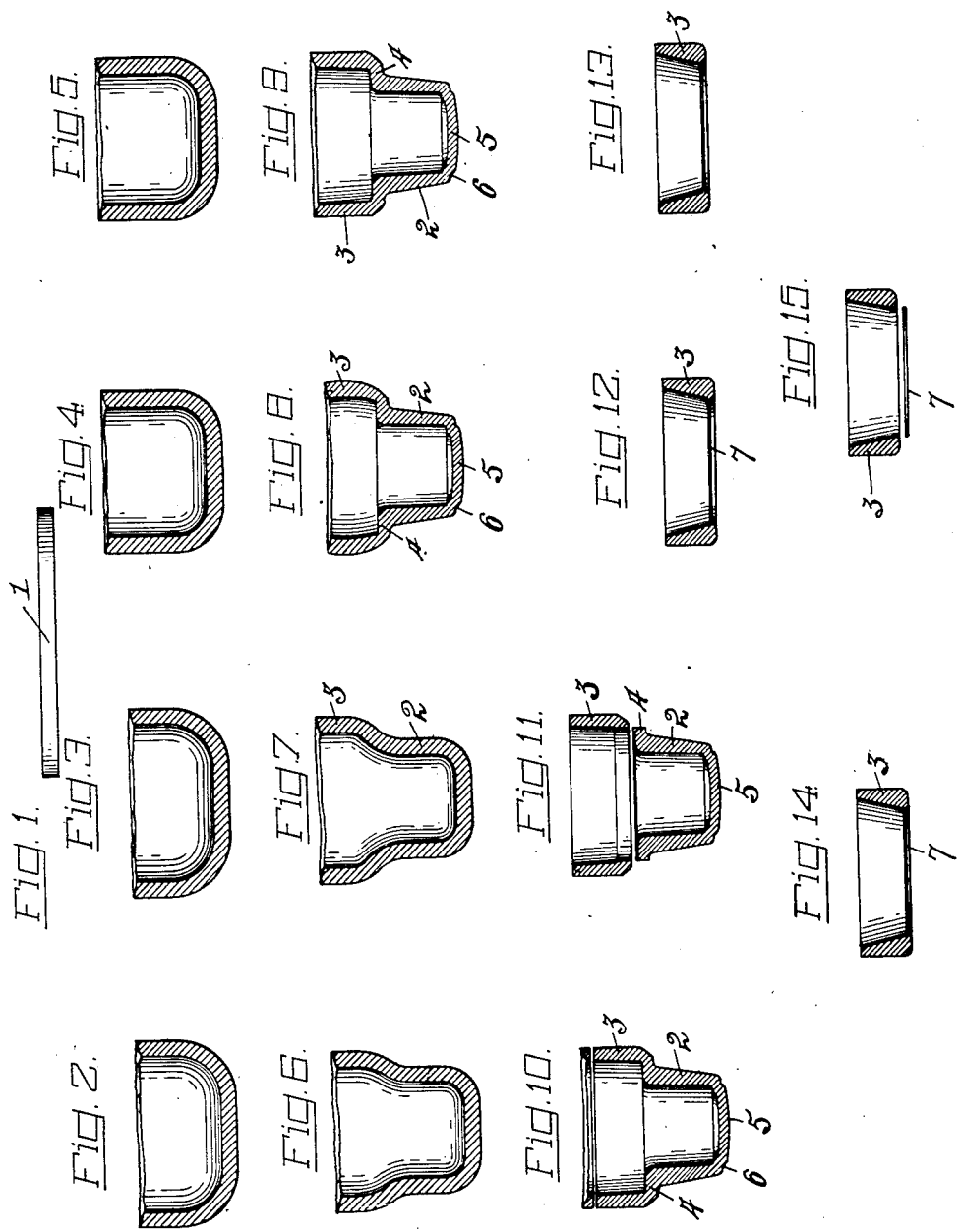

1,387,638.

Patented Aug. 16, 1921.
6 SHEETS—SHEET 2.

INVENTOR
Jeremiah Bingham,
By Owen, Owen & Crompton,
His attys.

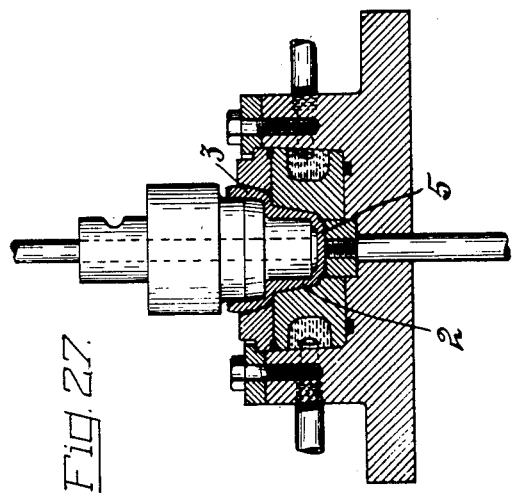
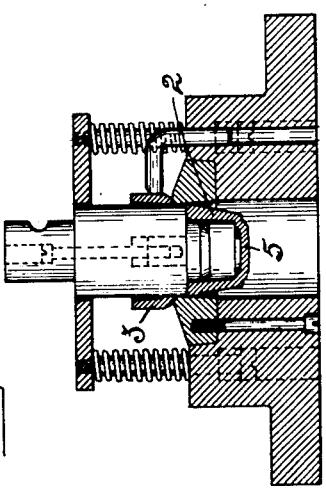
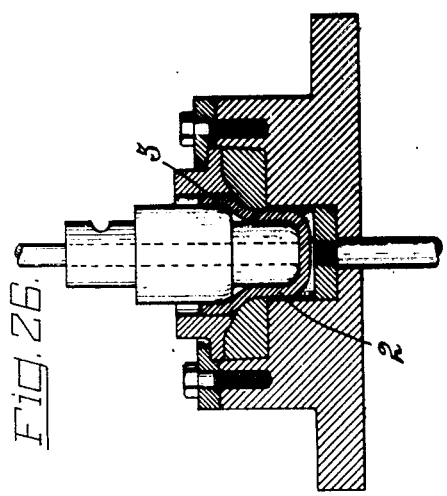
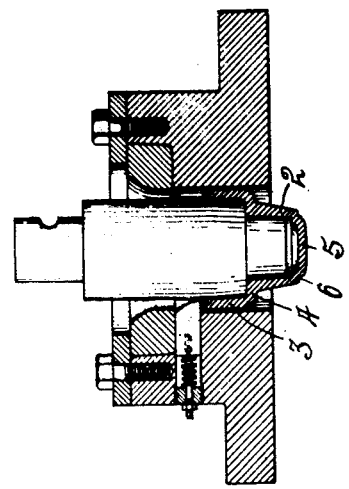

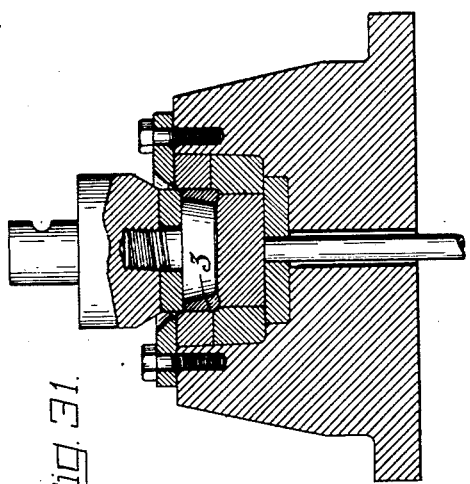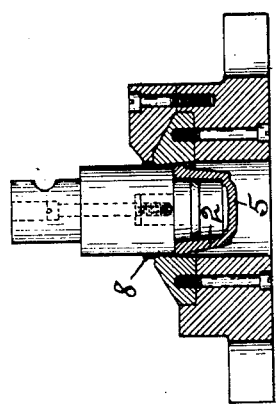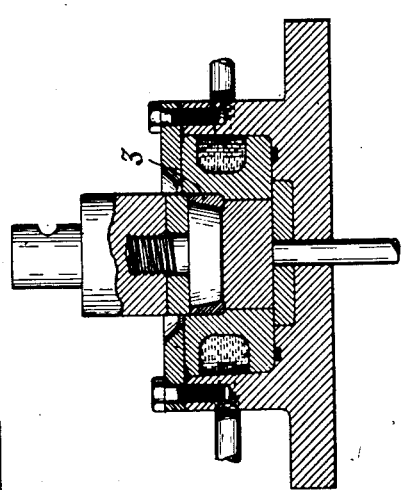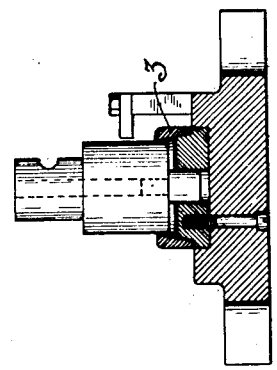

J. BINGHAM.
PROCESS OF MAKING CUP AND CONE MEMBERS FOR ROLLER BEARINGS.
APPLICATION FILED JULY 16, 1917.
1,387,638.
Patented Aug. 16, 1921.
6 SHEETS—SHEET 6.
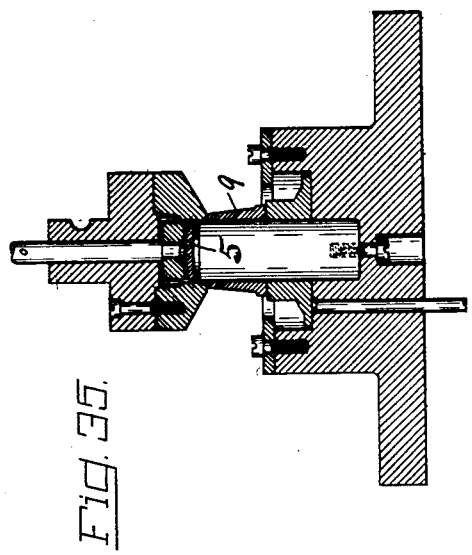
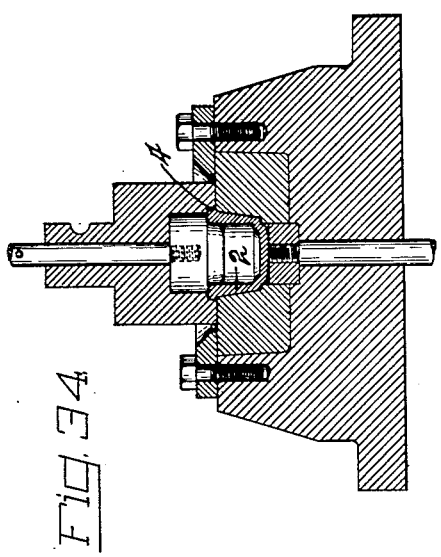
INVENTOR
Jeremiah Bingham.
By Bum. Bum & Crampton,
His attys

UNITED STATES PATENT OFFICE.

JEREMIAH BINGHAM, OF TOLEDO, OHIO, ASSIGNOR TO THE BOCK BEARING COMPANY, OF TOLEDO, OHIO, A CORPORATION OF OHIO.

PROCESS OF MAKING CUP AND CONE MEMBERS FOR ROLLER-BEARINGS.

1,387,638.

Specification of Letters Patent.  Patented Aug. 16, 1921.

Application filed July 16, 1917. Serial No. 180,802.

*To all whom it may concern:*

Be it known that I, JEREMIAH BINGHAM, a citizen of the United States, and a resident of Toledo, in the county of Lucas and State of Ohio, have invented a certain new and useful Process of Making Cup and Cone Members for Roller-Bearings; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the manufacture of roller bearings, and particularly to the cup and cone members thereof, and has for its object to simplify and lessen the cost of manufacture of such members.

The invention is fully described in the following specification, and while, in its broader aspect, it is capable of being practised in numerous ways, a preferred manner of practising the same is illustrated in the accompanying drawings, in which—

Figure 21:
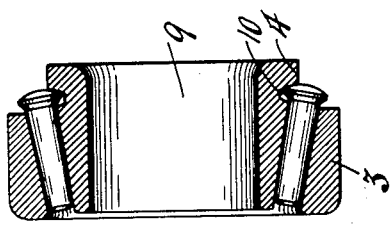
Figure 22:
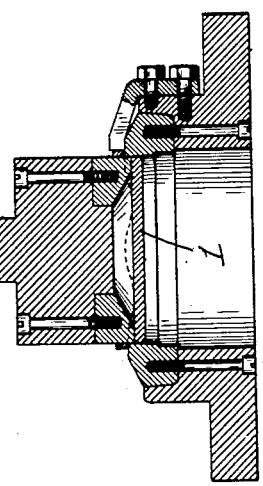
Figure 24:
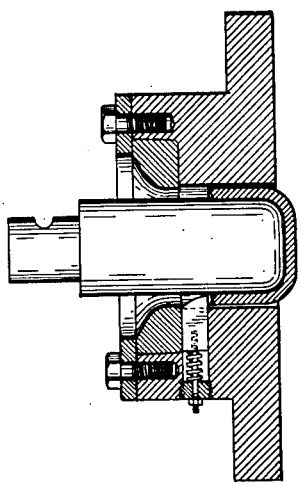

Figures 1 to 20 are sectional views of the article as it appears after each shaping, punching or treating operation to which it is successively subjected in the order presented. Fig. 21 is a sectional view of a bearing containing the cup and cone members. Fig. 22 illustrates the blank cutting operation. Figs. 23 to 28 illustrate the several successive shaping operations to which the blank is subjected before severing into separate cup and cone parts. Fig. 29 illustrates the cup and cone severing operation. Fig. 30 illustrates the hot cup swaging operation. Fig. 31 illustrates the cold cup sizing operation. Fig. 32 illustrates the cup inner edge trimming operation. Fig. 33 illustrates the cone flange trimming operation. Fig. 34 illustrates the cone swaging operation, and Fig. 35 illustrates the cone bottom punching out operation.

In the preferred method of practising my invention a blank 1 (Fig. 1) of substantially disk form is first cut, punched or otherwise suitably produced from a strip of flat metal, preferably steel, as indicated by Fig. 22. The blank is then subjected to several successive drawing, shaping and intermediate annealing operations (Figs. 2 to 7 and 23 to 26), which form the disk, in easy stages, into the cup-shaped part 2 of predetermined diameter and depth and having the transversely and longitudinally extending flange or rim portion 3 of larger diameter than the part 2. The cup-shaped part 2 subsequently forms the cone member of a bearing, and the flange or rim portion 3, except the inner edge thereof, subsequently forms the cup member of the bearings. Figs. 3 and 5 indicate the annealing steps, which take place after the shaping operations illustrated, respectively, in Figs. 23 and 24.

The next operation (Fig. 27), which is preferably performed hot, flattens out and thins the inner transversely extending portion of the flange 3 to form the radial shoulder or flange part 4 at right angles to the cup axis, and shapes the side wall of the part 2 to render its inner surface of true cylindrical form and its outer surface tapered with the diameter of the taper diminishing outward from the shoulder 4, leaving the article in substantially the form shown in Fig. 8. This operation also flattens the outer edge portion of the cup bottom 5, as shown at 6, with the outer side of such flattened portion extending inward at least to a point in line with the inner surface of the part 2. This operation also determines the length of the cone member.

By the next operation (Fig. 28) the outer side wall of the longitudinally extending portion of the flange 3 is shaped to render it of true cylindrical form, and the inner surface thereof has a slight outward taper imparted thereto, as shown by Fig. 9.

The next operation consists in trimming off the ragged outer edge portion of the flange 3, as shown in Fig. 10, which may be performed in a lathe or in any other suitable manner. This having been done the article is subjected to a shearing operation (Fig. 29), which severs the cup part 2 from the flange 3 at the outer edge of the connecting shoulder or flange part 4, thereby forming the two separate cup and cone members shown in Fig. 11. The cup member 3 is then subjected in a hot state to a swaging operation, which shortens the cup, increases the taper thereof and leaves it in substantially the shape desired, as shown in Fig. 12. This member is then tumbled to smooth its surface and remove any sharp edges or projections therefrom (Fig. 13), and is then subjected to a cold restriking or sizing operation (Figs. 14 and 31). The final operation on the cup member (Fig. 32) trues the inner restricted edge of the inner conical surface thereof and removes the bead 7 therefrom (Fig. 15).

Figure 17:
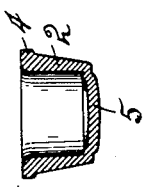
Figure 19:
Figure 20:
Figure 16:
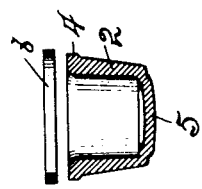
Figure 18:
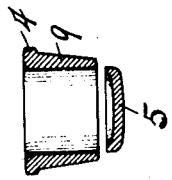
Figure 23:
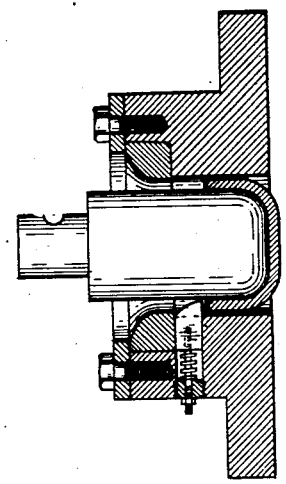
Figure 25:
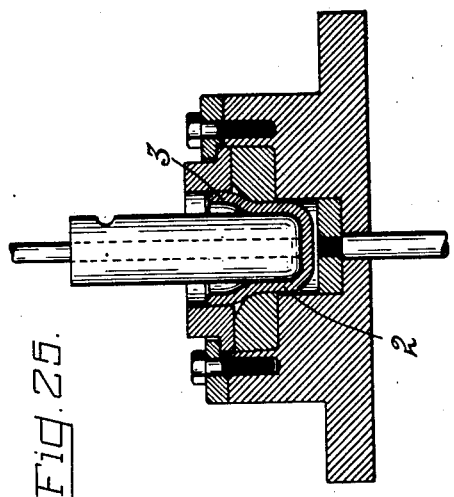

By the next operation (Fig. 33) the cone member 2 is acted on to shear off the surplus portion of the flange or shoulder 4, the ring 8 in Fig. 16 representing the portion removed. The cone is then sized by subjecting it to a swaging operation (Figs. 17 and 34). The bottom 5 of the cone is then punched therefrom (Figs. 18 and 35), leaving the member 9, which forms the cone proper of a roller bearing. The bore of the cone is now given the desired size by boring or otherwise suitably acting thereon (Fig. 19). The cone 9 may have a circumferential groove 10 (Fig. 20) formed therein at the base of the flange or shoulder 4 to provide a runway for the roller flanges.

It is evident that with my method of manufacturing the cup and cone members of roller bearings, the two are retained in a single integral piece until each is at least partially completed, when the two members are separated and finished, thereby reducing the necessary operations to a minimum and materially lessening the labor and expense incident to the manufacture of such members. It is also evident that the material which is cut from the interior of the cup member 3 is utilized to form the cone member and that the only waste which occurs is the ring 8 and bottom part 5, which are cut from the outer edge of the flange 4 and the bottom of the cone member 2, respectively.

It is apparent that the blank 1 is shaped to form integrally connected cylindrical portions of different diameters which are connected at their inner edges by a laterally projecting part or shoulder and which have reverse faces tapered, and that the connection between the cylindrical portions is severed to form separate members which may be fitted one within the other with their tapered faces opposed to each other to permit the insertion of roller bearings therebetween, as shown in Fig. 21.

While the separate members may be used without subsequent treatment, it is preferable to perform different finishing operations on both members, as illustrated in Figs. 12 to 20 and 30 to 35, thereby placing the members in a better commercial condition.

I wish it understood that while I have described and illustrated a particular process of making the cup and cone members of roller bearings, the invention is not restricted to the details and steps referred to, but such steps or details may be varied, added to or substracted from, and the form of the parts may be varied without departing from the spirit of the claims.

Having thus described my invention, what I claim as new, and desire to secure by Letters Patent, is—

1. The process of making the coacting cup and cone members of roller bearings, which consists in shaping a metal blank to form integrally connected cylindrical portions of different diameters suitable to set one within the other, forming the external surface of the smaller portion and the internal surface of the larger portion with tapered male and female bearing surfaces, respectively, and then severing the two portions adjacent to their inner ends.

2. The process of making the coacting cup and cone members of roller bearings, which consists in shaping a metal blank to form integrally connected cylindrical portions of different diameters suitable to set one within the other, with a radial connecting flange between their inner ends, forming the external surface of the smaller portion and the internal surface of the larger portion with tapered male and female bearing surfaces, respectively, and then severing said connecting flange adjacent to its outer end and substantially parallel with the axis of said portions to separate the two.

3. The process of making the coacting cup and cone members of roller bearings, which consists in forming a metal blank into a cup shaped member having an inner diameter such that it will form the cup bearing member, drawing from the material of the cup shaped member a portion having an external diameter such that it will form the cone bearing member, and then severing the portion forming the cone member from the portion forming the cup member.

4. The process of making the cup and cone members of roller bearings, which consists in forming a metal blank into a cup shaped member, drawing from the material at the closed end portion thereof a portion having an external diameter such that it will form the cone bearing member and shaping the rim portion of the cup shaped member for receiving the cone member, and then severing the portion forming the cone member from the portion forming the cup member.

5. The process of making the cup and cone members of roller bearings, which consists in forming a metal blank into a cup shaped member, drawing from the material at the member, drawing from the material at the closed end portion thereof a portion having an external diameter such that it will form the cone bearing member and shaping the rim portion of the cup shaped member for receiving the cone member, then severing the portion forming the cone member from the portion forming the cup member, and punching the bottom from the closed end of the closed member.

6. The process of making the cup and cone members of roller bearings, which consists in forming a metal blank into a cup shaped member, drawing from the material at the closed end thereof, a substantially cylindrical portion of reduced diameter to said cup shaped member, tapering the inner surface of the rim portion of said cup shaped member to form the cup bearing member, and tapering the outer surface of said reduced portion to form the cone bearing member, and then severing the two portions adjacent to their inner ends.

7. The process of making the cup and cone members of roller bearings, which consists in forming a metal blank into a cup shaped member, then drawing it to form a rim portion having a diameter which is substantially that of the cup bearing member, and a body portion having a diameter which is substantially that of the cone bearing member, forming the rim portion with an internal tapered bearing surface and the body portion with an external tapered bearing surface, forming a radial connecting flange between the inner ends of said portions, and then severing said flange to separate said portions.

8. The process of making the cup and cone members of roller bearings, which consists in forming a metal blank into a cup shaped member, then drawing it to form a rim portion having a diameter which is substantially that of the cup bearing member, and a body portion having a diameter which is substantially that of the cone bearing member, forming the rim portion with an internal tapered bearing surface and the body portion with an external tapered bearing surface, forming a radial connecting flange between the inner ends of said portions, then severing said flange to separate said portions, and subsequently sizing said portions to form the respective mating cup and cone bearing members.

9. The process of making the cup and cone members of roller bearings, which consists in forming a metal blank into a cup shaped member, drawing from the material at the closed end thereof, a substantially cylindrical portion of reduced diameter to said cup shaped member, tapering the inner surface of the rim portion of said cup shaped member to form the cup bearing member, and tapering the outer surface of said reduced portion to form the cone bearing member, then severing the two portions adjacent to their inner ends, and punching the bottom from the cone portion axially thereof and substantially flush with its inner surface.

10. The process of making the cup and cone members of roller bearings, which consists in forming a metal blank into a cup shaped member, then drawing it to form a rim portion having a diameter which is substantially that of the cup bearing member, and a body portion having a diameter which is substantially that of the cone bearing member, forming the rim portion with an internal tapered bearing surface and the body portion with an external tapered bearing surface, forming a radial connecting flange between the inner ends of said portions, then severing said flange to separate said portions, and punching the bottom from the cone member axially thereof, and substantially flush with its inner surface.

11. The process of making the cup and cone members of roller bearings, which consists in forming a metal blank into a cup shaped member, drawing from the closed end portion thereof, a substantially cylindrical portion of reduced diameter to said cup portion, forming a radial connecting flange between the outer end portion of the cup shaped member and said reduced portion, forming the outer surface of the reduced portion with a tapered bearing surface, severing said connecting flange longitudinally of the member axis and swaging and sizing the large and small severed portions to form the respective mating cup and cone bearing members.

12. The process of making the cup and cone members of roller bearings, which consists in forming a metal blank into a cup shaped member, drawing from the closed end portion thereof, a substantially cylindrical portion of reduced diameter, forming a radial connecting flange between the large and reduced portion of said member, forming the inner surface of the large outer end portion of said member with a tapered bearing surface, severing said connecting flange longitudinally of the member axis, and swaging and sizing the large and small severed portions to form the respective mating cup and cone bearing members.

13. The process of making cup and cone members for roller bearings, which consist in shaping a metal blank to form integrally connected substantially cylindrical portions of different diameters with the outer end of the smaller one closed, flattening the connection between said portions to form a radial flange and tapering the outer wall of the smaller portion and the inner wall of its inner portion, and then severing said flange adjacent to its outer edge to separate said portions, cutting the bottom from the smaller portion and sizing the two portions to form cup and cone members.

14. The process of making cup and cone members for roller bearings, which consists in drawing a disk-like metal blank into cup form, then acting thereon to provide the cup with a smaller cylindrical inner end portion and a relatively larger cylindrical outer end portion with an outwardly flaring connection portion therebetween, then flattening and thinning said connecting portion to form a radial flange and externally tapering said small portion and internally tapering the large portion of the cup to form cup and cone parts, then severing the flange between the adjacent ends of said parts and adjacent to the outer cup part, then hot swaging the cup part to shorten it and increase its taper, striking the bottom from the cone part and sizing the cup and cone parts.

15. The process of making cup and cone members of roller bearings, which consists in shaping a metal disk to form integrally connected longitudinally spaced cylindrical portions of different diameters, acting on said portions and the connection therebetween to form said connection into a flattened radial flange and to internally taper the large portion and externally taper the small portion with the greatest diameter of the small portion less than the greatest internal diameter of the large portion and flattening the outer end of the small portion at least to a point in longitudinal alinement with the inner cylindrical wall of said small portion, then severing the flange connection between said portions adjacent to its outer edge, punching the bottom from the small portion in line with its inner cylindrical surface and sizing and trimming the cup and cone members thus formed.

16. The process of making cup and cone members for roller bearings, which consists in shaping a disk-like metal blank to form integrally connected cylindrical portions of different diameters with a laterally projecting connecting portion therebetween and with the inner surface of the larger and the outer surface of the smaller cylindrical portions tapered, and then severing the connecting portion in a plane substantially parallel to the axes of the cylindrical portions and substantially flush with the inner surface of said larger portion.

17. The process of making the mating cup and cone members of roller bearings, which consists in drawing a metal blank in cup shape, then diametrically reducing the inner end portion relative to the outer end portion thereof, and forming a radially projecting annular flange between the adjacent ends of said portions, forming the inner end portion with an outer tapered bearing surface and the outer end portion with an inner tapered bearing surface, and then severing said flange substantially in parallel relation to the axis of said portions to separate the portions, cutting the bottom from the small portion and sizing the cup and cone members thus formed.

18. The process of making cup and cone members of roller bearings, which consists in drawing a metal blank into cup shape, then diametrically reducing the inner end portion relative to the outer end portion thereof and forming a radially projecting annular flange between the adjacent ends of said portions, forming the inner end portion with an outer tapered bearing surface and the outer end portion with an inner tapered bearing surface, and then transversely severing said flange to separate said portions, cutting the bottom from the small portion, and sizing the cup and cone members thus formed.

19. The method of forming a plurality of race-members from a single sheet-metal blank, comprising the cupping of the blank by successive operations to form portions of different diameters, clamping the metal of the blank intermediate the portions of different diameters to limit the flow of metal, upsetting the portion of smaller diameter to form non-parallel outer and inner faces, severing the portion of larger diameter and re-fashioning said severed portion.

20. The method of forming a plurality of race-members from a single sheet-metal blank, comprising the cupping of the blank by successive operations to form portions of different diameters with a laterally-extending intermediate connecting portion, heating the blank, clamping the laterally-extending intermediate portion of the blank to prevent the flow of metal therethrough and upsetting the lower portion, severing said laterally-extending portion to separate the portions of different diameters, and re-fashioning the severed portions.

21. The method of forming a plurality of race-members from a single sheet-metal blank, comprising the cupping of the blank by successive cold drawing operations to form portions of different diameters, heating the cupped blank, upsetting the portion of smaller diameter to re-fashion the same, severing the blank in the laterally-extending portion thereof, re-fashioning the portion of larger diameter, and severing the closed end from the portion of smaller diameter.

22. The method of forming coöperating race members, comprising the cupping of a sheet-metal blank, fashioning portions of said cupped blank to be of different diameters, and severing the different diametered portions from each other.

23. The method of forming coöperating race members, comprising the cupping of a sheet-metal blank, re-fashioning of the blank to form portions of different diameters connected by a laterally-extending intermediate portion, severing the larger diameter portion and re-fashioning the same to form the outer race member, and re-fashioning the smaller diameter portion to form the inner race member with an enlarged head from the laterally-extending portion.

24. The method of forming coöperating race members, comprising the cupping of a sheet-metal blank, fashioning said cupped blank to have substantially cylindrical portions thereof of different diameters connected by an intermediate laterally-extending portion, severing the portion of larger diameter from the laterally-extending portion, re-fashioning the severed portion to form a conical inner face, and re-fashioning the smaller diameter portion together with the laterally-extending portion to form an inner race having a conical outer face and enlarged head.

25. The method of forming a plurality of race-members from a single sheet-metal blank, comprising the cupping of the blank, re-fashioning the cupped blank to form portions of different diameters, severing the different diametered portions from each other, and re-fashioning said severed portions.

26. The method of forming a plurality of race-members from a single sheet-metal blank, comprising the cupping of the blank by successive operations forming portions of different diameters, re-fashioning the cupped blank to form non-parallel walls, and severing the portions of different diameter from each other.

In testimony whereof, I have hereunto signed my name to this specification.

JEREMIAH BINGHAM.